United States Patent [19]

Kobori

[11] 4,152,062
[45] May 1, 1979

[54] CAMERA WITH PLASTIC BODY

[75] Inventor: Toshio Kobori, Sakai, Japan

[73] Assignee: Minolta Camera Kabushiki Kaisha, Osaka, Japan

[21] Appl. No.: 774,729

[22] Filed: Mar. 7, 1977

[30] Foreign Application Priority Data

Mar. 18, 1976 [JP] Japan .................................. 51/30072

[51] Int. Cl.² ...................... G03B 17/00; G03B 17/02
[52] U.S. Cl. .................................... 354/203; 354/288
[58] Field of Search .............. 354/202, 203, 288, 187, 354/275, 212, 246; 24/73 MF, 201 V, 204; 85/54, 37; 151/14.5

[56] References Cited

U.S. PATENT DOCUMENTS

| 2,043,926 | 6/1936 | Fuerst | 354/288 |
| 2,213,708 | 9/1940 | Lange | 85/54 UX |
| 2,890,638 | 6/1959 | Rentschler | 354/246 X |
| 2,903,953 | 9/1959 | Meixner | 354/203 |
| 2,948,204 | 8/1960 | Kopp et al. | 354/275 |
| 3,002,438 | 10/1961 | Trow | 354/203 |
| 3,223,011 | 12/1965 | Hunt et al. | 354/275 |
| 3,380,361 | 4/1968 | Winkler | 354/203 |
| 3,461,637 | 8/1969 | Jansson | 24/73 MF X |
| 3,893,496 | 7/1975 | Wallace et al. | 151/14.5 |
| 4,034,388 | 7/1977 | Iwashita et al. | 354/212 X |
| 4,067,032 | 1/1978 | Yoshikawa et al. | 354/288 |

FOREIGN PATENT DOCUMENTS

| 850932 | 9/1970 | Canada | 354/212 |
| 1147839 | 4/1963 | Fed. Rep. of Germany | 354/288 |
| 924880 | 5/1963 | United Kingdom | 354/288 |
| 1238333 | 7/1971 | United Kingdom | 354/212 |

OTHER PUBLICATIONS

Popular Photography, 7/1976, Minox Advertisement p. 43.

Primary Examiner—Donald A. Griffin
Attorney, Agent, or Firm—Wolder, Gross & Yavner

[57] ABSTRACT

A camera body includes at its rearside a frame having a rectangular window delineating the area of an image of an object projected onto the film and a pair of film guide longitudinal rails and is integrally formed of a reinforced polymeric resin or plastic material to reduce the weight thereof. Spacer members on which is abuttable a film pressure plate secured to the rear cover of the camera is made of metal of high machinability and are embedded in, clinched to, or threaded into the camera body so as to rearwardly project from the camera body. When abutting the spacer members, the pressure plate accurately positions a film guided by the film guide rails, in the direction perpendicular to a surface of the film, i.e., in the direction of the optical axis of a picture taking optical system since high accuracy is obtained by machining the spacer members.

9 Claims, 5 Drawing Figures

CAMERA WITH PLASTIC BODY

BACKGROUND OF THE INVENTION

The present invention relates to a camera of the type in which the positioning of the film is effected by means of a film pressure plate wherein the body proper of the camera is molded of fiber reinforced synthetic polymeric resin plastics.

There has been a recent demand in the field of cameras to reduce the weight of the camera body. To meet this demand, an attempt has been made, in which the camera body is molded by using glass-fiber-reinforced synthetic organic polymeric resins or plastics, instead of metal such as aluminum or the like. From the viewpoint of reducing the weight of the camera, it is preferably that the camera body be integrally molded of a reinforced plastic. The molded reinforced plastics are in general likely to cause strains due to molding shrinkage after the molding and possess poor machinability, so that any dimensional errors due to the strain in the abutting surfaces which engage the pressure film plate and the film rail surface cannot be corrected by machining. To overcome this shortcoming, a countermeasure has been taken, particularly in the case of a camera in which a high image definition is required, such as in a lens interchangeable single lens reflex camera in which a film guide member 2 having film abutting surfaces 5 and film rail surfaces 4, as seen in FIG. 1, is made of a metal possessing the desired machinability, separately from the body proper of the camera, and then the film guide member 2 thus fabricated, is fastened such as by screws 3 to the body proper of the camera 1. This construction provides high accuracy to the body back and its location (the distance from abutting surfaces 5 to the objective lens mounting surface on the front portion of the camera body, which serves to establish the position of the camera interchangeable) as well as to the film guide tunnel width (the distance between the abutting surface 5 and the film rail surfaces 4), thus allowing for better image definition of a camera. The formation of the guide member 2 having abutting surfaces 5 and the film rail surfaces 4 from a metal, separately of the camera body proper, results in an increase in the weight of the camera itself, thus failing to meet the requirement of reducing the weight of the camera by making the camera body from a plastic and resulting in undesirable consequences of making a complex die for the guide member 2.

SUMMARY OF THE INVENTION

It is accordingly, an object of the present invention to provide a camera with a body of a light weight, which is capable of providing high image definition and can be manufactured with a minimum of labor.

To accomplish the above object, the body of the camera of the present invention is made of a synthetic organic polymeric resin or plastic material, and spacing means formed of a metal or metallic material is fitted on the camera body so as to project from the same. The camera body is provided with a frame having a rectangular window or aperture delineating the area of the image of an object projected onto the film and guide means provided at opposite longitudinal sides of the frame. The guide means has a rear or top surface for guiding the film along the aperture whereas the spacing means has a rear or top surface on which a pressure plate is abuttable, and the distance between the guide and spacing means rear surfaces is determined such that the film can easily traverse or pass through the space delineated by the rear surface of the guide means and the pressure plate abutting the rear surface of the spacing means. The pressure plate, when abutting the rear surface of the spacing means, engages the film guided by the guide means and thereby properly positions the same in the direction perpendicular to a surface of the film, i.e., in the direction of the optical axis of a picture taking optical system and relative to the focal plane of the camera.

With such a construction, the guide means can be molded together with other parts of the camera body by using a plastic material and a metal is used only for the spacing means among the parts of the body of a conventional camera, so that the weight of the camera body is reduced to a considerable extent. In addition, for the manufacture of the camera of the present invention, little labor is required since only the spacing means, which may be of a simple shape, is manufactured separately from the camera body. Furthermore, since the spacing means possesses high machinability because it is made of metal, high accuracy and precision is easily obtained at its rear surface by machining. Thus, it is possible to have the pressure plate accurately position the film in the direction perpendicular to a surface of the film, that is, relative to the camera focal plane. In contrast, since the guide means is made of a plastic material, its top surface may have low accuracy due to molding shrinkage and thus flatness of the film employed may be lost. However, the camera body of the present invention can provide at least the necessary or a high image definition since the accurate positioning of the film is achieved as described above.

In the preferred embodiments of the present invention, the camera body is made of a reinforced plastic material, advantageously including glass fiber reinforcement to reduce the molding shrinkage as much as possible. The spacing means includes metal members partially embedded in the camera body, members clamped or riveted to the camera body, and/or members threaded into and cemented to the camera body.

The above and other objects and features of the present invention will become more apparent from the following description of the preferred embodiments of the present invention taken in connection with the accompanying drawings.

DESCRIPTION OF PREFERRED EMBODIMENTS

Figure 1:
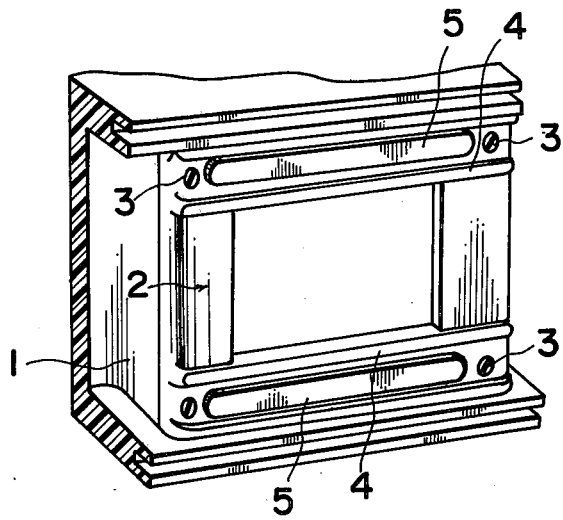
FIG. 1 is a rear perspective view of a camera body of conventional single lens reflex cameras for use with interchangeable lenses.
Figure 2:
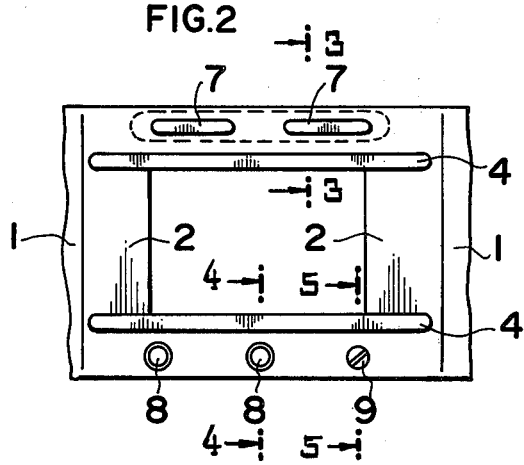
FIG. 2 is a rear plan view of a camera body according to the present invention, showing the use of various spacing or abutting members in combination.
Figure 3:
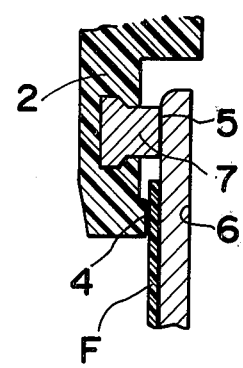
FIG. 3 is a cross-sectional view taken along line 3—3 in FIG. 2 showing a spacing or abutting member embedded into the camera body shown in FIG. 2.
Figure 4:
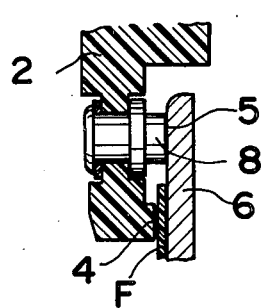
FIG. 4 is an inverted cross-sectional view taken along line 4—4 in FIG. 2 showing a spacing or abutting member clamped or riveted to the camera body shown in FIG. 2.
Figure 5:
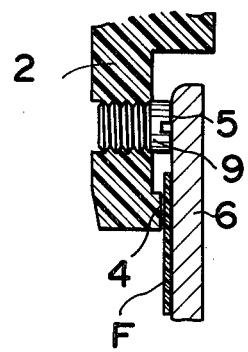
FIG. 5 is an inverted cross-sectional view showing a spacing or abutting member threaded into and cemented to the camera body shown in FIG. 2.

Referring now to FIGS. 2 through 5 which illustrate preferred embodiments of the present invention which is shown as applied to a single lens reflex camera having an interchangeable lens, a film guide portion 2 and a pair of film guide rails 4 constituting part of the film guide portion are molded to a fiber reinforced synthetic polymeric resin or plastic integrally with the other parts of the camera body proper 1 of a camera. Spacer members or portions 7, 8, and 9 abuttable on a film pressure plate 6 secured to the rear cover of the camera (not shown) are respectively made of a metal such as aluminum having superior machinability, separately of the camera body proper and secured to the film guide portion 2 above and below the pair of film rails 4 formed above and below an aperture defining the area of an image of an object projected onto a film F. In the case of the spacer portion 7 which is comparatively long in the film feed or longitudinal direction, it is preferable to insert the enlarged base of the spacer portion 7 in the camera body proper at the time of molding, as shown in FIG. 3. In the case where the spacer portions 8 and 9 are in the form of pins, then the spacer portions may be clinched as seen in FIG. 4, or may be threaded in a screw hold provided in the film guide portion 2, and then fixed therein by using a bonding agent, as seen in FIG. 5.

With the arrangements as shown in FIGS. 3 and 4, spacer portions 7 and 8, after having been anchored by embodiment or clinching in position, are machined by a milling machine to provide rearwardly directed abutting surfaces 5, for adjustment of the body back. With the arrangement shown in FIG. 5 the head of spacer portion 9 is first subjected to milling for providing abutting surface 5, thereby adjusting the length of the screw to be threaded, or the spacer portion 9 itself is threaded into a threaded hole for rough positioning, then fixed thereto by using a bonding agent, and then the head of the spacer portion is machined by a milling machine so as to provide the abutting surface 5. This allows adjustment of the body back. Spacer portions 7, 8 and 9 are simple in construction and hence may be inexpensively manufactured with less effort.

The embodiments described above possess the advantage in that an improved accuracy in the positioning and fitting of the body back are obtained and the machining of the spacer portions 7, 8 and 9 is easily accomplished. The film guide or tunnel width tends to be influenced and deformed by the strain due to molding shrinkage, since the film rails are molded of reinforced plastics integrally with body proper 1. However, tests reveal that, so far as the desired accuracy for the body back is concerned, it may be achieved and the position of the film in the direction perpendicular to the surface of the film F, i.e., in the direction of the optical axis of an objective lens (not shown) may be controlled with accuracy by means of the film-bearing plate 6, lowered accuracy in tunnel width due to strain, i.e., impaired flatness of the film plane has no significant influence on the image definition. In short, the result is that desired image definition may be achieved when spacer portions 7, 8 and 9 are made of a material having superior machinability and a body back of improved accuracy is achieved.

While specific embodiments have been described and illustrated, the present invention should by no means be limited thereto. For example, as long as the material forming spacer portions 7, 8 and 9 possess sufficient rigidity and machinability to maintain a given shape, plastics other than reinforced plastics and metals may be used. The embodiment in FIG. 2 shows a case where the spacing portions of three different types 7, 8 and 9 are employed in combination in a single camera. This is merely for the purposes of exemplifying the combined use of spacer portions of different types in a single camera. It should however, be understood that among the spacer portions of the three illustrated different types, any one or two of them may be employed in a single camera. The specific embodiments have been described in the case where the present invention is applied to a lens interchangeable, single lens reflex camera, but it finds application to other cameras having no interchangeable lens, improving the image definition for cameras of this type as well.

I claim:

1. A lens exchangeable lightweight camera for use with a photographic film, comprising:
    a camera body made of a plastic material and including a plate portion having a rectangular frame surrounding an aperture delineating the area of an image of an object projected onto said film, said plate portion including as a part thereof guide means having a rear surface for guiding said film along said aperture;
    metal spacer members mounted on and projecting from said plate portion and having rear surface, said spacer members extending in an intermittent manner along opposite longitudinal sides of said frame so as to be independent of each other;
    a pressure plate abuttable on said rear surfaces of said spacer members for engaging said film to position said film in the direction perpendicular to a surface of said film, the distance between said rear surface of said guide means and said rear surfaces of said spacer members being such that said film can pass through the space between said rear surface of said guide means and said pressure plate abutting said rear surfaces of said spacer members.

2. A camera as defined in claim 1 wherein said camera body is made of a reinforced plastic material including glass fibers.

3. A camera as defined in claim 1, wherein said spacer members are embedded into said plate portion at the opposite sides of said frame upon molding of said camera body.

4. A camera as defined in claim 1, wherein said spacer members are clinched to said plate portion on the opposite sides of said frame.

5. A camera as defined in claim 1, wherein said spacer members are threaded and cemented to said plate portion at the opposite sides of said frame.

6. A lens exchangeable lightweight camera employing a film advanceable in a longitudinal direction comprising a body member integrally formed of a synthetic polymeric resin and including a plate portion which has a rectangular window delineating a photographic image projection area and film guide means located along opposite longitudinal edges of said window and having rearwardly directed faces, said camera further comprising rearwardly projecting metal spacer members mounted on said plate portion of said body member at positions transversely outwardly offset from said film guide means and extending intermittently along said guide means so as to be independent from each other, said metal spacer members having rearwardly directed end faces disposed rearwardly of said guide means rearwardly directed faces, and a pressure plate urged into engagement with said spacer member end faces and retained thereby a predetermined distance from said film guide means rearwardly directed faces to provide film border passageways between said pressure plate and said film guide means.

7. The camera of claim 6 wherein at least one of said spacer members comprises an enlarged rear portion embedded in said synthetic organic polymeric body member.

8. The camera of claim 6 wherein at least one of said spacer member includes a forward portion engaging an opening in said body member and having axially spaced enlarged portions clinching the opposite faces bordering said opening.

9. The camera of claim 6 wherein said body member has at least one tapped bore and at least one of said spacer members comprises a screw portion engaging and bonded to said bore.

* * * * *